(No Model.) 2 Sheets—Sheet 1.
S. CHESTER.
SUBTERRANEAN ELECTRIC CONDUCTOR.
No. 250,499. Patented Dec. 6, 1881.
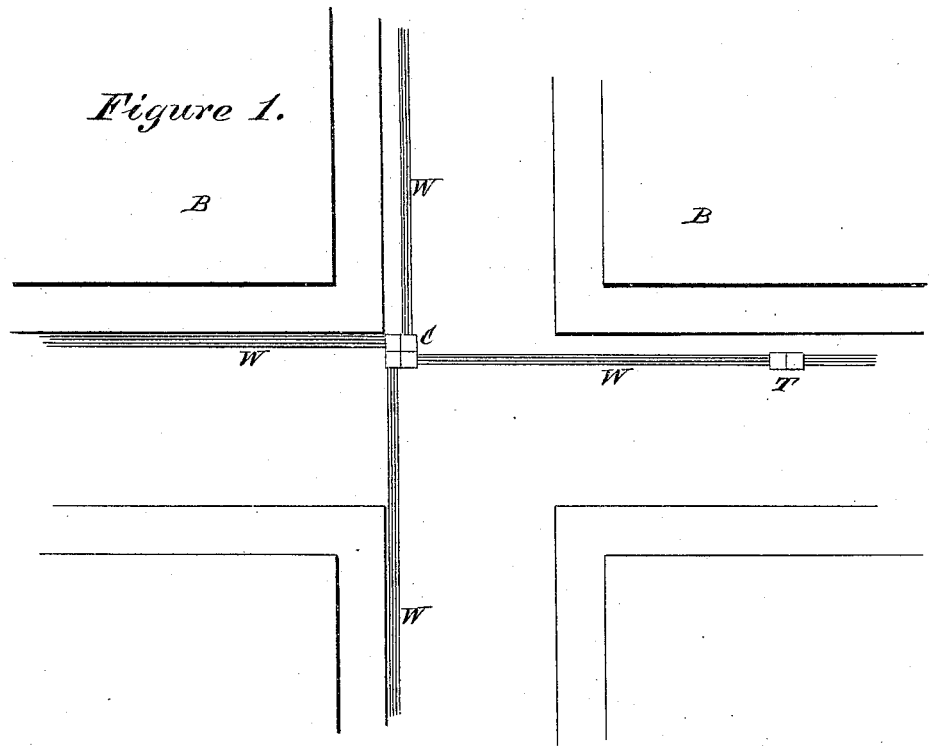
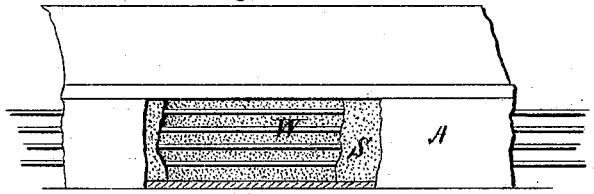
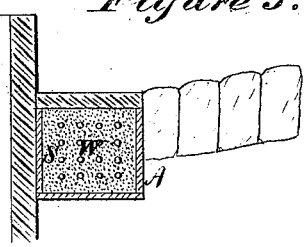
Witnesses:
Geo. W. Miatt
Wm. A. Pollock
Inventor:
Stephen Chester,
By his attorney,
E. N. Dickerson (No Model.) 2 Sheets—Sheet 2.
S. CHESTER.
SUBTERRANEAN ELECTRIC CONDUCTOR.
No. 250,499. Patented Dec. 6, 1881.
*Figure 4.*
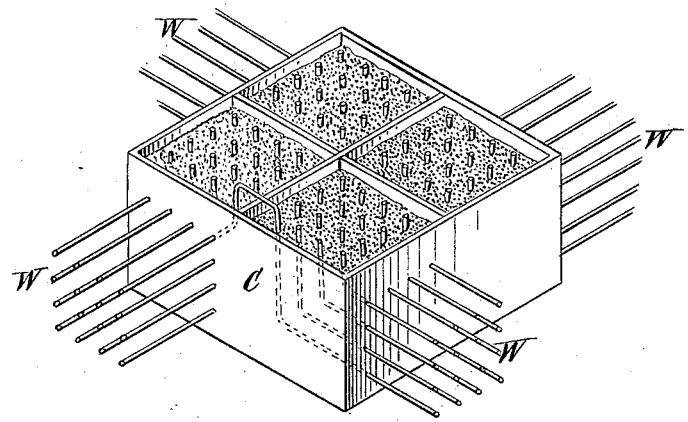
*Figure 5.*
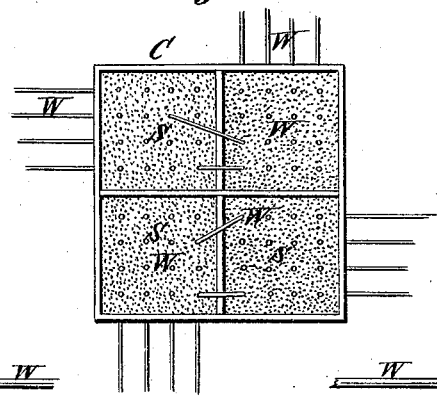
*Figure 7.*  *Figure 8.*
  
*Figure 6.*
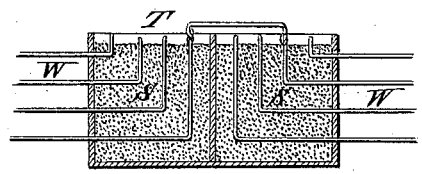
Witnesses:
Geo. W. Miatt
Wm. A. Pollock.
Inventor:
Stephen Chester,
By his Attorney
E N Dickerson

UNITED STATES PATENT OFFICE.

STEPHEN CHESTER, OF ELIZABETH, NEW JERSEY.

SUBTERRANEAN ELECTRIC CONDUCTOR.

SPECIFICATION forming part of Letters Patent No. 250,499, dated December 6, 1881.

Application filed August 5, 1881. (No model.)

*To all whom it may concern:*

Be it known that I, STEPHEN CHESTER, of the city of Elizabeth, and county of Union, in the State of New Jersey, have invented a new and useful Improvement in Subterranean Electric Conductors, of which the following is a full, true, and exact description, reference being had to the accompanying drawings.

My invention consists in the method of laying one or several electric conductors under the surface of the ground or pavements of streets, in the method of insulating such conductors from each other or from the ground in which it or they may be buried, and in the several devices and appliances made use of to avoid or counteract the several objections which have hitherto attached to such subterranean or partially-subterranean telegraph-lines as have been used, all of which more fully appears in the following.

It has heretofore been the custom in subterranean or partially-subterranean electric lines to use copper wires of small size insulated with gutta-percha, india rubber, or some similar substances, bunches of which were drawn through metal tubes intended to protect them from abrasion or contact with the ground. The objections which exist, or which are alleged to exist, to this method of constructing such lines are as follows:

First. Copper wires insulated with the above-mentioned materials are in themselves extremely expensive; the metal pipe inclosing a group adds to this cost, and the difficulty of drawing long lengths of such bunches through tubes without abrasion of the insulating material or other injury to the wires increases the cost still more, and causes a total expense greatly exceeding that of aerial lines.

Second. Neither of the insulating materials mentioned is indestructible when buried in the ground.

Third. No provisions have hitherto been made to provide for relative displacements of wires from expansion and contraction; hence the wires are extremely liable to breakage or other injury from that cause.

Fourth. In case of any injury to any wire of a group, the difficulty of finding the injured spot and repairing it is extreme, and the operation attended with great risk of injury to the other wires.

Fifth. The close proximity of several separate conductors to each other subjects these lines to all the annoying phenomena arising from induction, which prevents submarine cables from being used with the same facility as aerial lines of equal length.

My invention consists in the method of laying these wires in the situation in which they are to be used, and surrounding them with an insulating covering; in the peculiar system which I employ, allowing of frequent tests and determinations of any accident or injury to the wires, and in the means shown for avoiding injury or breaking of the wires by expansion or contraction.

I usually employ bare metallic wires which are embedded in a cement composed of sand saturated, when hot, with resin, paraffine, or other equivalent insulating substances, preferably petroleum products.

In towns and cities the wires are laid as follows: The locality chosen being, of course, dependent upon the surroundings and conditions of each individual case, that ordinarily preferred would be in close contiguity to the curbstone separating the sidewalk from the street, and on the outside thereof and immediately beneath the gutter-stone. This or the equivalent paving-stone being removed, a rough box or trough, of a size corresponding to the number of wires to be placed, is sunk to such depth that the gutter-stone may be properly replaced. In this box a layer of clean hot sand is placed— say, for instance, to a depth of one inch—and this is immediately saturated with the melted insulating-mixture before mentioned. As soon as this cement has hardened a layer of bare metal wires is laid thereon, and with suitable apparatus placed at convenient intervals the several wires are grasped and tightly drawn in the position they are desired to occupy, and another layer of hot sand superimposed and again treated as before. As soon as this layer has set the stretching apparatus may be removed to another convenient distance and the operation repeated. It will be observed that if these several distances be very great the natural recoil of the wire will free it from close attachment to the surrounding insulating mass. Second, third, and fourth layers may follow each other as rapidly as the covering of the preceding layer has hardened. Hence the several wires will be in straight lines, parallel to each other and equidistant at all points, and as they are confined as to any lateral motion, but comparatively free as regards longitudinal motion, contraction and expansion, will produce no "buckling" or relative displacement where laid in straight lines and for reasonable distances. If convenient, the edges of the wires might be supported by racks or holders placed at intervals, which would serve to prevent their displacement while the sand is laid upon them.

My invention will be clearly seen from the accompanying drawings, in which Figure 1 represents a plan view of my system, showing generally the method of cross-connection and test-boxes. Fig. 2 represents a number of my wires in position in the inclosing-box. Fig. 3 represents a cross-section of the same. Fig. 4 represents one of the cross-connection boxes used at corners. Fig. 5 represents a plan of the same. Fig. 6 represents one of my test-boxes; and Figs. 7 and 8 represent contrivances allowing of the expansion and contraction of the wires, and at the same time maintaining electrical continuity.

My series of wires are represented by W and B. Fig. 1 represents blocks or houses. The wires W are arranged to be placed under the gutter-stone, but might be arranged at other portions of the street. These wires are arranged to be laid in the avenues and cross-streets wherever they may be required. Wherever two or more series of wires come together or cross a cross-connection box, C, is placed, in which the ends of all the wires are exposed, and by these boxes a means is offered of connecting any contiguous wire with another, or, in case of injury to any one of the wires, it could be replaced by another. At short intervals throughout the town I place test-boxes T, in which all the wires of a given series are brought above the surface of the ground, as shown in Figs. 5 and 6, and are then cross-connected in the test-boxes described and cross-connection boxes, Fig. 4.

In Figs. 2 and 3 is shown the method of laying the wires under the curb-stone, the inclosing wooden box being represented by A, the wires by W, and the sand or cement by S.

In Figs. 7 and 8 is shown the contrivance allowing the expansion and contraction. W represents the wires, K the tube into which the ends of the wires enter. The ends of the wires are not permanently fastened together, but are connected by means of a ribbon spiral, Fig. 7, or wire spiral, Fig. 8. In Fig. 8 the ends of the spiral wire, which is made of copper, enter holes through the ends of the larger iron wire W, which avoids the necessity of using a pipe having an internal diameter larger than the wire.

In every case where, from necessity, angles in direction must occur, or at necessary distances in long straight lines, the following provision is made against harmful displacement of the wires or the breakage of wires or cement, because of the contraction and expansion. The wire is cut and the ends separated to a reasonable distance, and the electric connection continued by a metal ribbon wound spirally, the ends of which are securely and sufficiently fastened respectively to the separated ends of the main wire. To prevent this from becoming so choked with the cement during the process of laying that it will not act, a loose-fitting tube is slipped over each joint. It is useful and desirable to have frequent points where all these wires shall be easy of access, for the following reasons: First, in seeking the localities of defects in insulation, "contacts," or other troubles by electric measurement, such defects can be located with extreme accuracy, if the lengths examined be reasonably short; second, if the wires are accessible at reasonable distances, the length in which defect exists may be quickly thrown out and an unused wire substituted without disturbing the structure. Therefore at such positions the wires are brought to the surface in a box, which may be divided in the interior into two compartments, one of which receives the wires from one direction, the other the termini of wires from the opposite direction. This box may be of wood or metal, and provided with a movable cover, and it may for convenience be located upon the edge of the sidewalk, and the wires within separated and held in position by the insulating-cement, a sufficient length of wire projecting therefrom to permit of connections being made. At all points where transverse lines cross each other similar boxes would be placed containing four interior compartments, Fig. 4.

It is evident that since bare wire only need be used in this system, and that for all ordinary telegraphic purposes bare iron wire, the principal cost will be in the work performed in opening the trenches and placing the cement, &c., while the actual cost of wire used would be relatively trifling. Therefore, where several wires upon any route were required, it would be natural that the party laying them would take advantage of the occasion to place many other unrequired wires, in anticipation of further use. The boxes above mentioned afford easy and instant facilities for making up routes from these extra wires as occasion requires.

I have above said that for all ordinary telegraphic purposes the wires used may be of iron. When conductors of great capacity are required—as, for instance, for electric light—copper wire may of necessity be used; but in either or any case the conductors will be of large gage or diameter, and as it has been before shown that all harmful effects of expansion and contraction are prevented, it is almost impossible to conceive of any contingency wherein a wire can become broken. Any defect, then, to which such lines can become subject must arise from the cracking of the insulating-cement, so as to permit partial connection by water entering such cracks; but it has been already shown that any such defect may be quickly and exactly located and the repair of such defect may follow with equal facility and rapidity—the gutter or paving stone being raised, a hot iron thrust in the cement, and a little melted paraffine poured in, the difficulty ceases.

I do not confine myself to the use of conductors composed of bare metallic wires, tubes, or plates embedded in an insulating-cement. It is evident that any insulated or uninsulated electric conductor may be placed, substantially as above described, in trenches supported in their relative positions by insulating-cement, sand, or earth, or even by occasional wooden or other supports, so as to preserve equal relative distances. Thus placed, and the expansible joint or its equivalent being occasionally employed, and the wires being brought to the surface frequently for connection, the system employed would in each case be substantially the same.

Preferably I would employ bare round wire, because of its tensile strength, conductivity, cheapness, and ease in handling and placing.

What I claim as my invention, and desire to secure by Letters Patent, is—

1. In combination with a wire or series of wires supported and insulated by a stationary supporting and insulating cement, expansion couplings or joints placed at suitable intervals, connecting the free ends of the wire or wires, thereby allowing the free ends of such wires to approach and recede from each other without breaking the continuity of the electric circuit, and simultaneously avoiding any risk of fracture of the conductor, substantially as and for the purpose described.

2. The method of laying electrical conductors which consists in placing a series of parallel conductors in an inclosing box or case, of filling the interstices between such conductors with a finely-divided absorbent matrix, and then of filling the interstices and pores of such matrix with melted paraffine or equivalent binding and insulating cement, substantially as and for the purposes described.

3. The improved subterranean insulated conductors herein described, which consist of a series of wires surrounded by an envelope or matrix of sand surrounding such electric conductors or wires, said sand being itself impregnated with paraffine, and the whole mass being laid beneath the surface of the earth, substantially as described.

4. The method of laying electric conductors in a stationary inclosing insulating matrix or cement composed of a finely-divided absorbent matrix impregnated with paraffine or equivalent binding and insulating cement, which consists in stretching such conductors parallel to each other and at considerable tension, of then pouring the matrix or cement around them, and then releasing the tension before the cement has finally set, whereby they are disconnected from said cement in process of laying, and free to expand and contract independent of such cement, substantially as and for the purposes described.

STEPHEN CHESTER.

Witnesses:
ANTHONY GREF, Jr.,
WM. A. POLLOCK.